US008224300B2

(12) United States Patent
de Silva (10) Patent No.: US 8,224,300 B2
(45) Date of Patent: Jul. 17, 2012

(54) METHOD AND APPARATUS TO ENHANCE NAVIGATION USER EXPERIENCE FOR A SMART PHONE DEVICE

(75) Inventor: Andrew S. de Silva, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 223 days.

(21) Appl. No.: 12/635,910

(22) Filed: Dec. 11, 2009

(65) Prior Publication Data

US 2011/0143726 A1    Jun. 16, 2011

(51) Int. Cl.
*H04M 3/42*    (2006.01)
(52) U.S. Cl. .................................... 455/414.1
(58) Field of Classification Search ................ 455/414.1
See application file for complete search history.

(56) References Cited

U.S. PATENT DOCUMENTS

| | | | |
|---|---|---|---|
| 6,909,947 | B2 | 6/2005 | Douros et al. |
| 6,925,425 | B2 | 8/2005 | Remboski et al. |
| 7,292,152 | B2 | 11/2007 | Torkkola et al. |
| 2006/0286930 | A1 | 12/2006 | Rathus et al. |
| 2007/0266191 | A1 | 11/2007 | Schnepp et al. |

*Primary Examiner* — William D Cumming
(74) *Attorney, Agent, or Firm* — Muramatsu & Associates (57) ABSTRACT

An apparatus and method diverts navigation guidance provided by a phone when an incoming call occurs to achieve uninterrupted route guidance. In one aspect, a communication system is integrated with the phone to divert the route guidance to a vehicle audio system or display screen when there is an incoming call. The communication system can also be integrated with a cradle, a haptic commander or a radio head unit, which can be communicatively connected with the phone and the vehicle, such that when the incoming call occurs, the route guidance information is transmitted from the phone to the vehicle audio system or display screen through the cradle, etc. Furthermore, the communication system can continuously track the vehicle location to restart the navigation system in the phone when the call is ended.

20 Claims, 13 Drawing Sheets

METHOD AND APPARATUS TO ENHANCE NAVIGATION USER EXPERIENCE FOR A SMART PHONE DEVICE

FIELD OF THE INVENTION

This invention relates to a smart phone device integrated with a navigation system. More specifically, this invention is related to an apparatus and method to divert the navigation guidance on the smart phone to a vehicle audio system or display screen when an incoming call occurs.

BACKGROUND OF THE INVENTION

The use of computer has become more and more pervasive in modern society. Integrating computer technologies with the phone is one of the remarkable advances in recent years. In addition to the functions provided by traditional phones, a so called "smart phone" ("hereafter may also be referred to as "phone") device is not only equipped with entertainment applications, but also location-aware applications such as a navigation system.

A few problems may arise with the recent increase in popularity of smart phones. One of the problems is the prioritization of the phone functionality over the navigation functionality. For example, if the user receives a phone call while preparing to execute a maneuver, the voice guidance which the user depends on to execute the maneuver may be interrupted as the smart phone's audio output has been switched to the phone ringer. This situation may bring significant stress to the user and cause driver distraction when the incoming call and the voice guidance occur at the same time. Such disruptive situations can be worse for businessmen and executives who have frequent incoming or outgoing calls while driving.

Figure 1:
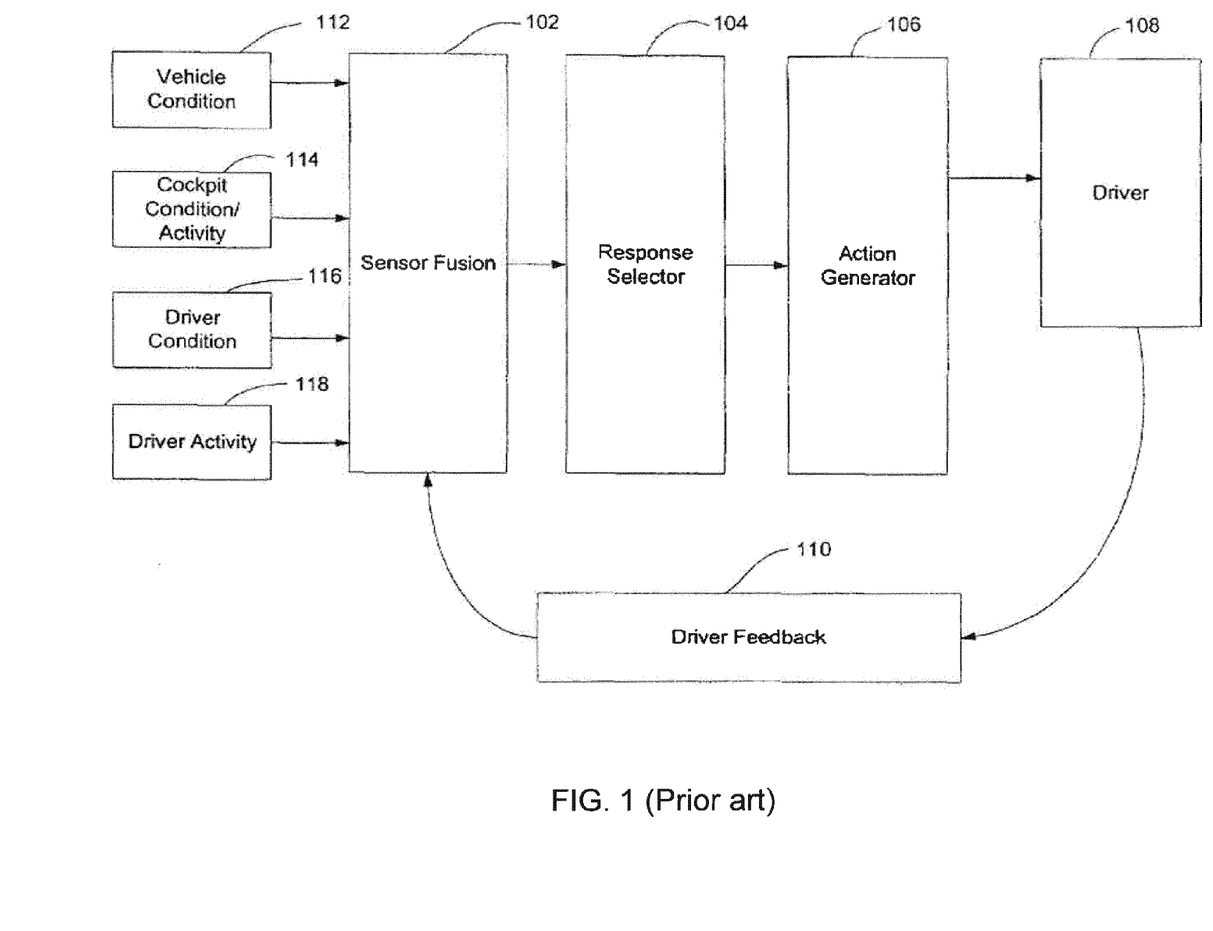
FIG. 1 illustrates a prior art disclosing a system adapted to assess information incoming to a vehicle operator, to prioritize the information based upon a number of conditions relating to the vehicle operation, the operating environment, the activity of the operator and the physical condition of the operator, and to provide to the operator the most pertinent information for the given set of conditions.

U.S. Pat. No. 6,925,425 to Remboski et al. discloses a system adapted to assess information incoming to a vehicle operator, to prioritize the information based upon a number of conditions relating to the vehicle operation, the operating environment, the activity of the operator and the physical condition of the operator, and to provide to the operator the most pertinent information for the given set of conditions, as illustrated in FIG. 1. More particularly, the system provides a mechanism for informing the caller that they are calling a driver and provides the option to divert the call to voice mail. However, Remboski does not discuss about the prioritization between the phone and navigation application. Also, Remboski does not disclose anything related to delivering the voice route guidance to the audio system or the display screen in the vehicle when the incoming call occurs.

Figure 2:
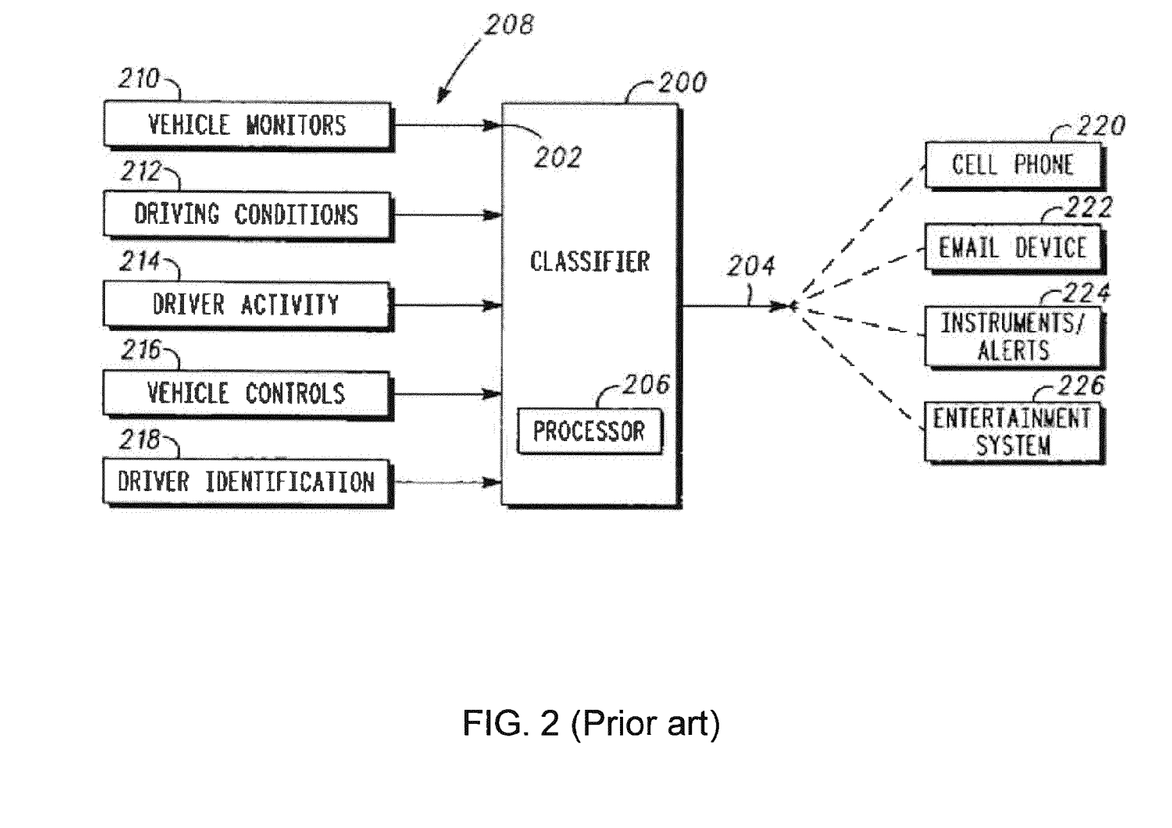
FIG. 2 illustrates a prior art disclosing a method and apparatus for classifying a driver's activity state use based on sensor data relating to at least one vehicle operating condition to determine driver activity.
Figure 3:
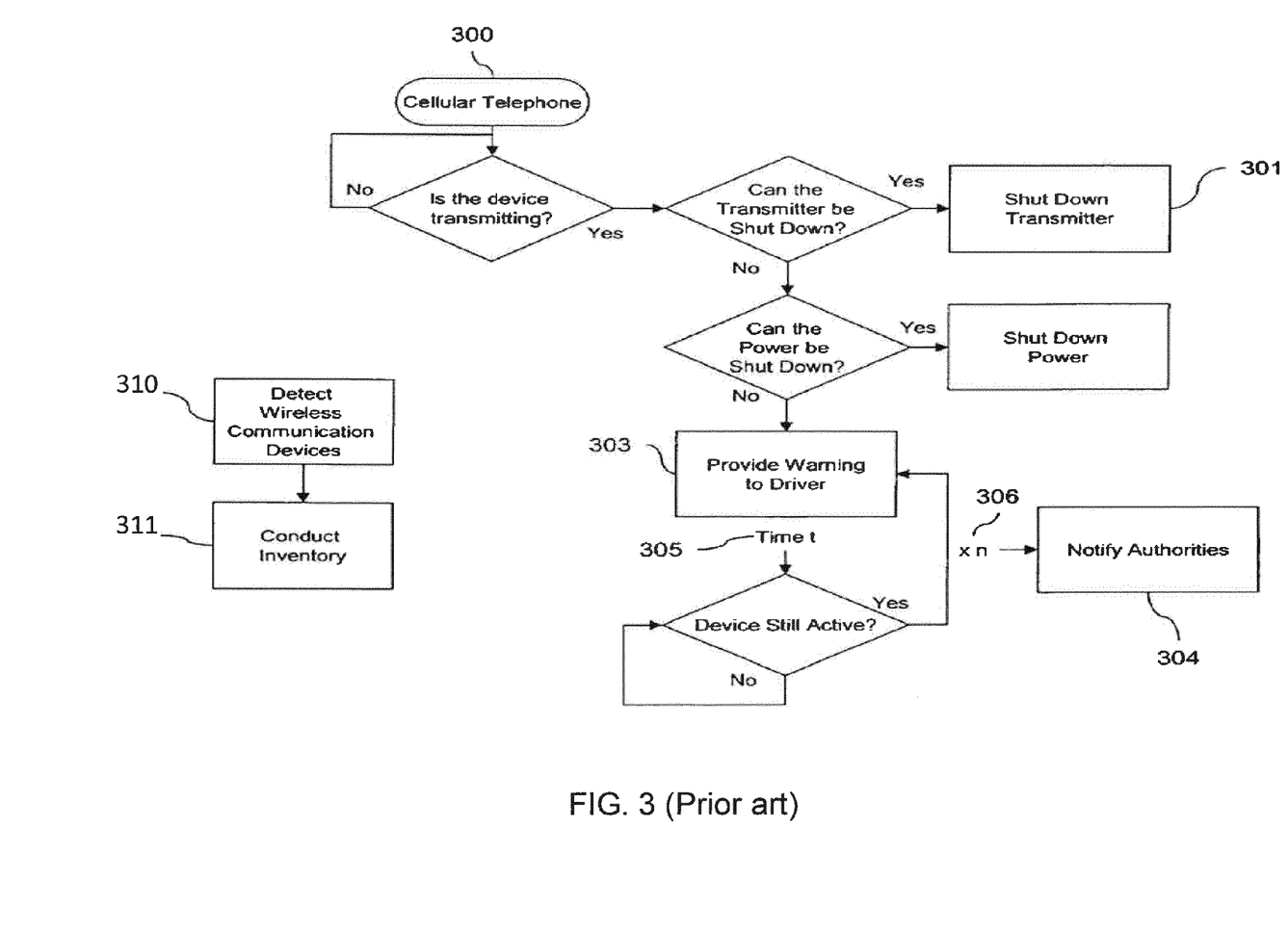
FIG. 3 illustrates a prior art disclosing a method and a system for communication device management within a vehicle. The communication device includes a cellular telephone, personal computer, PDA, pocket computer, and hybrid device.

U.S. Pat. No. 7,292,152 to Torkkola et al, discloses a method and apparatus for classifying a driver's activity state based on sensor data relating to at least one vehicle operating condition to determine driver activity, as shown in FIG. 2. More specifically, a classifier can be communicatively coupled with a cellular phone, and when the classifier determines that the driver's cognitive load is beyond a threshold level, e.g. during a time classified as "maneuver," an incoming cell phone call may be diverted to a voice mail. However, Torkkola neither discusses about the prioritization between the phone and navigation application, nor discloses anything related to delivering the route guidance to the audio system or the display screen in the vehicle when the incoming call occurs.

U.S. Pat. App. Pub. No. 2006/0286930 discloses a method and a system for communication device management within a vehicle. The communication device includes a cellular telephone, personal computer, PDA, pocket computer, and hybrid device. More particularly, the system includes an intelligent controller which is adapted to detect any present communication devices in the area and conduct an inventory which provides information about each detected device. Furthermore, the intelligent controller compares the information to a standard of use data, which specifies the conditions need to be present for allowing the usage of a communication device. If such conditions are not met, the intelligent controller sends commands to the communication device to restrict its functionality. Similar to Remboski and Torkkola, the system does not prioritize between the phone and navigation application, nor discloses anything related to delivering the route guidance to the audio system or the display screen in the vehicle when the incoming call occurs.

Therefore, there remains a need for a new and improved apparatus and method to provide the user uninterrupted route guidance on the smart phone even when an incoming call occurs. More specifically, the route guidance may be diverted either to an audio system or to a display screen in a vehicle, such that the driver does not have to worry about the incoming phone call which may interrupt the route guidance.

SUMMARY OF THE INVENTION

It is an object of the present invention to reduce driver distraction by providing the smart phone user uninterrupted route guidance in the vehicle even when an incoming call occurs.

It is another object of the present invention to provide an apparatus and method to divert the route guidance to an audio system or to a display screen in a vehicle when the driver is receiving an incoming call on the smart phone.

It is another object of the present invention to provide a cradle to dock the smart phone and divert the route guidance from the smart phone to the audio system or the display screen in the vehicle.

It is still another object of the present invention to provide a haptic commander which is configured to interface the smart phone with either the audio system or the display screen in the vehicle to divert the route guidance thereto when the incoming call occurs.

It is a further object of the present invention to provide a method and an apparatus which can be integrated with the smart phone to prioritize between the incoming phone call and the navigation functionality, such that the navigation functionality is not being interrupted when the driver receives a phone call.

It is still a further object of the present invention to provide a method and an apparatus to continuously track the vehicle location when the route guidance has been diverted to the vehicle audio system, such that when the phone call is ended, the navigation system in the smart phone can be restarted to provide the driver the latest vehicle location and necessary route guidance. The vehicle's position may be continuously tracked even if the phone call is longer than it takes for certain maneuvers stored in the memory device. Furthermore, if the phone call is prolonged, the method and apparatus in the present invention will cache the next N maneuvers to provide the user route guidance when the user is still on the phone.

According to one aspect of the present invention, a method to provide uninterrupted route guidance to a smart phone user in a vehicle includes the steps of displaying a route guidance on a smart phone; detecting whether there is an incoming phone call; diverting the route guidance to an audio system or a display screen in the vehicle if an incoming call occurs; providing route guidance to the user from either the audio system or the display screen in the vehicle; and continuously tracking the location of the vehicle.

In the method of the present invention, the step of diverting the route guidance to an audio system or a display screen in the vehicle may further include the steps of connecting a cradle to the vehicle; docking the smart phone to the cradle; and transmitting route guidance information from the cradle to the audio system or display screen in the vehicle. In one embodiment, the cradle can be connected to the vehicle by using wireless connection. In another embodiment, the cradle can be connected to the vehicle with a wire.

In some embodiments, the step of diverting the route guidance to an audio system or a display screen in the vehicle may further include the step of connecting the smart phone to a haptic commander; connecting the haptic commander to the vehicle; and transmitting the route guidance to the haptic commander. The connection between the haptic commander and the vehicle or the haptic commander and the smart phone, can be wired or wireless.

In the method of the present invention, the step of diverting the route guidance to an audio system or a display screen in the vehicle may further comprise the steps of storing one or more route guidance in a memory device in either the cradle, the haptic commander or a radio head unit, and updating the memory device after completing each maneuver in the route guidance.

The method to provide uninterrupted route guidance to a smart phone user in a vehicle may further include a step of continuously tracking the vehicle location in either the cradle, the haptic commander or the radio head unit, such that when the call is ended, a navigation system in the vehicle can be restarted to provide the driver the latest vehicle location and necessary route guidance.

In another aspect, an apparatus to provide uninterrupted route guidance to a smart phone user in a vehicle includes a memory device; a voice controller; a communication unit adapted to control the communication between the smart phone and the apparatus, and between the apparatus and the vehicle; and a vehicle location detecting unit, wherein when an incoming call occurs, the route guidance is transmitted from the smart phone to the apparatus, then to the vehicle via the communication unit.

In one embodiment, the apparatus may be a cradle on which the smart phone can be mounted. In another embodiment, the apparatus may be a haptic commander. In a further embodiment, the apparatus can be a radio head unit. In an exemplary embodiment, the apparatus can be integrated into the smart phone.

In another embodiment, the apparatus may include a vehicle location tracking device which is adapted to continuously track the vehicle position after the incoming call occurs, such that when the call is ended, the navigation system can be restarted to provide the driver the latest vehicle location and necessary route guidance.

The present invention together with the above and other advantages may best be understood from the following detailed description of the embodiments of the invention illustrated in the drawings below.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

This invention relates to a smart phone (may also be referred to as "phone") device with a navigation system which is communicatively connected with an in-vehicle sound and/or display system. More specifically, this invention is related to an apparatus and method to divert the navigation guidance operation and information on the smart phone to a display screen or an audio system in the vehicle when an incoming call occurs. As stated above, the navigation guidance operation on the smart phone is usually interrupted by the incoming call, which may cause significant driver distraction especially when the driver is executing a maneuver. To make it worse, the interruption might lead to an accident.

Figure 4:
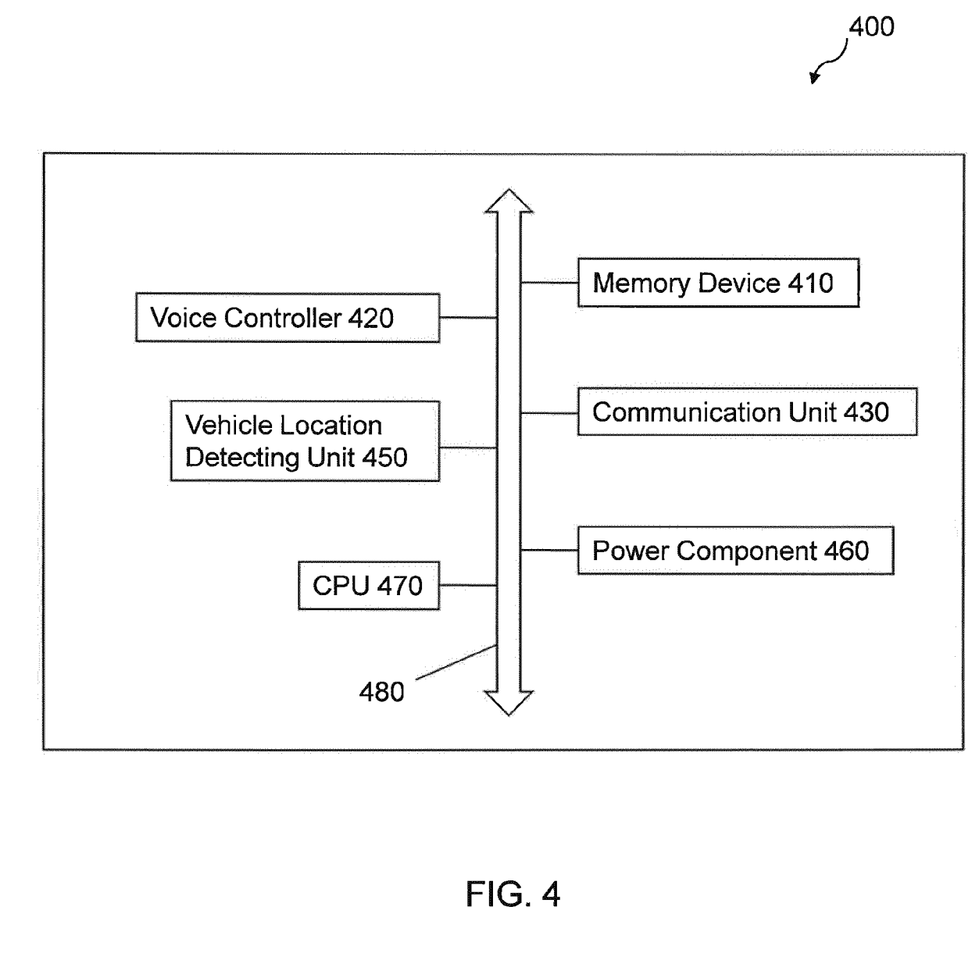
FIG. 4 illustrates a communication system in the present invention to divert navigation guidance from a smart phone to a vehicle display screen or a vehicle audio system.

Referring to FIG. 4, a communication system 400 to divert navigation guidance from a smart phone to a vehicle display screen or a vehicle audio system comprises a memory device 410 to store at least a portion of the navigation guidance received from the smart phone; a voice controller 420; a communication unit 430, where the communication unit 430 is adapted to receive instructions from the smart phone to transmit the navigation guidance information from the communication system 400 to the vehicle audio system or display screen.

The communication system 400 may also include a vehicle location detecting unit 450 to continuously track the vehicle position after the incoming call occurs; a power component 460 to maintain data stored in the memory device 410 and operate the voice controller 420; a CPU 470 to control the overall operation of the communication system 400; and a bus 480 to interface the above units or device in the communication system 400. The vehicle location detecting unit 450, in some embodiments, may not be integrated with the communication system 400, but may communicate with it via a software interface (not shown).

Figure 4A:
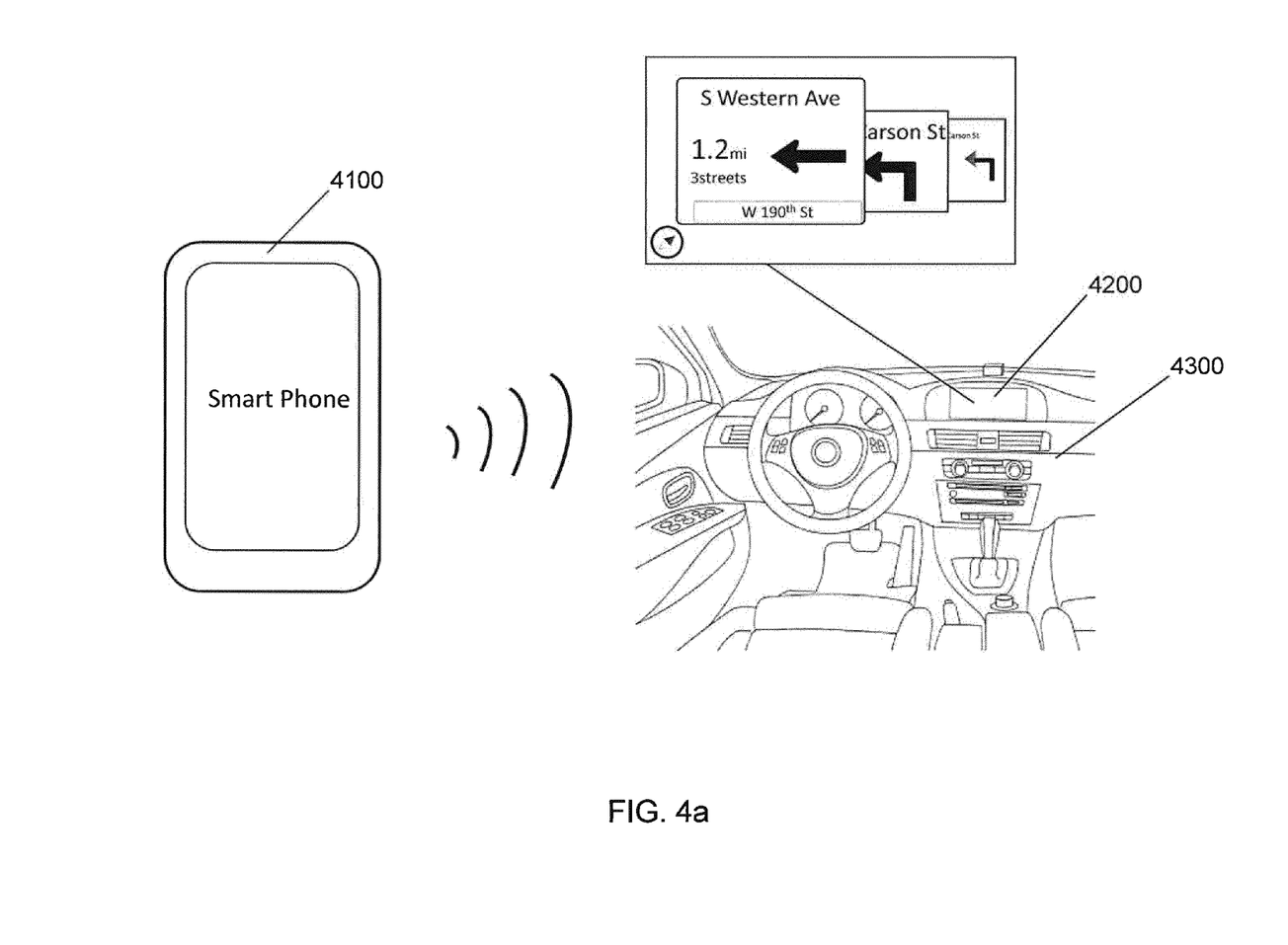
FIG. 4a illustrates one embodiment in the present invention, wherein the communication system shown in FIG. 4 is integrated in a smart phone.

In one embodiment, the communication system 400 can be integrated into a smart phone 4100. As shown in FIG. 4a, when navigation route guidance is provided to the driver on the smart phone 4100 and the driver receives an incoming phone call, the communication system 400 is triggered to divert the route guidance information to either the vehicle audio system 4300 or the display screen 4200. More particularly, when the incoming call occurs to interrupt the route guidance, the memory device 410 is adapted to store information on the next N maneuvers at the time. Also, the communication unit 430 receives instructions from the smart phone 4100 to store the next N maneuvers information in the memory device 410, and further transmit the maneuvers information to either the vehicle audio system 4300 or display screen 4200, so that the route guidance for the driver is not interrupted by the phone call.

Meanwhile, the vehicle location detecting unit 450 continuously tracks the location of the vehicle, such that when the call is ended, the navigation application can be resumed to provide the driver the latest vehicle location and necessary route guidance. If the conversation takes longer than the time to make the next N maneuvers, the vehicle location detecting unit 450 may still track the vehicle's current position until the navigation application is restarted. In some smart phones, the navigation application may still be running in the background, but no voice or visual guidance is given when the user is talking.

Figure 4B:
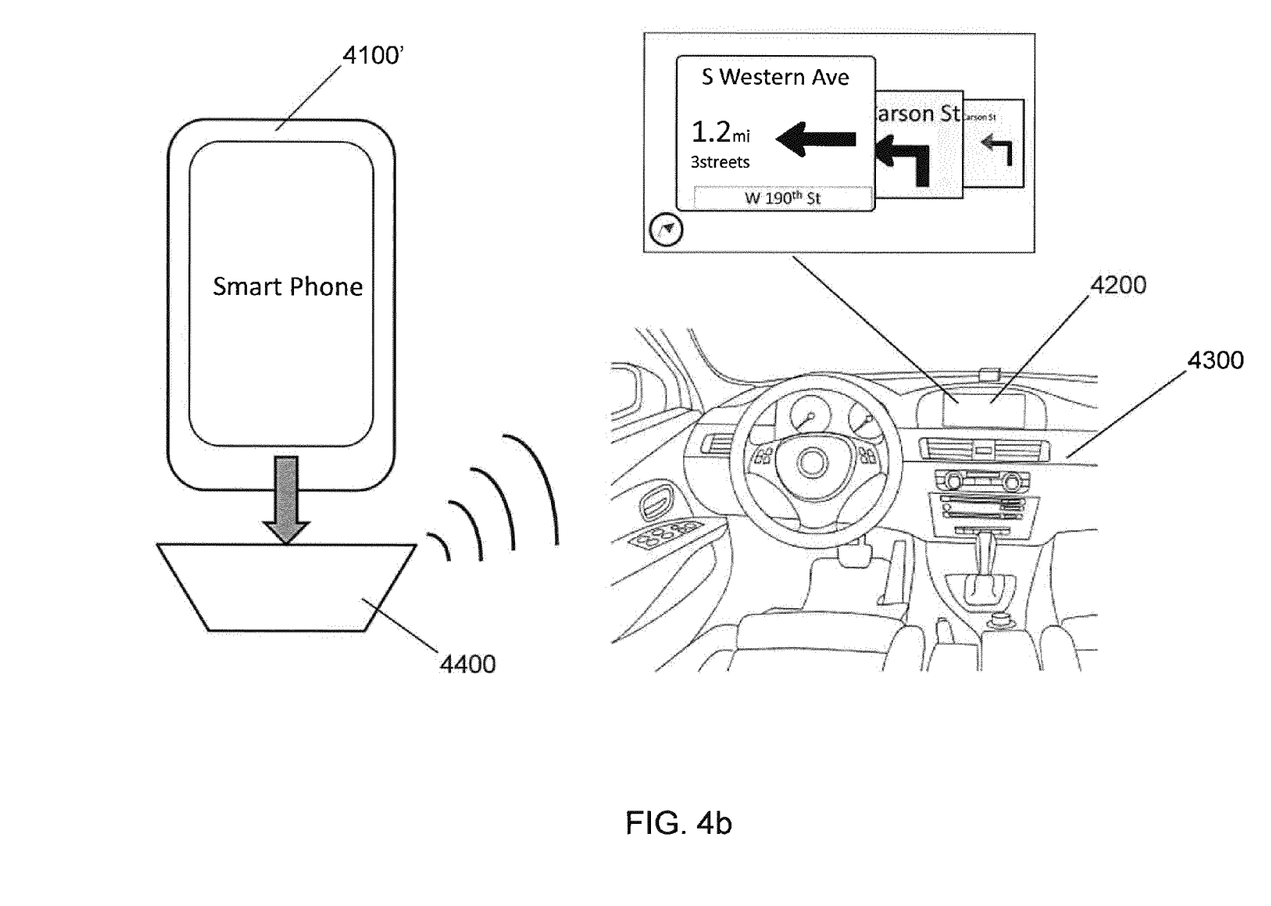
FIG. 4b illustrates another embodiment in the present invention, wherein the communication system shown in FIG. 4 is integrated with a cradle.

In another embodiment, the communication system 400 may not be integrated with a smart phone 4100'. As can be seen in FIG. 4b, the smart phone 4100' is docked in a cradle 4400 which the communication system 400 is integrated into. Similarly, when the incoming call occurs, the communication system 400 in the cradle 4400 is triggered to divert the route guidance operation and information from the smart phone 4100' to the vehicle audio system 4300 or the display screen 4200. More specifically, the next N maneuvers information is stored at the memory device 410 when the incoming call occurs to interrupt the route guidance, and the communication unit 430 receives instructions from the smart phone 4100' to transmit the maneuvers information to either the vehicle audio system 4300 or display screen 4200, so that the route guidance for the driver is not interrupted by the phone call. In still another embodiment, the voice controller 420 in the cradle 4400 is adapted to provide voice route guidance to the driver when there is an incoming call. The vehicle location detecting unit 450, similarly as stated above, is configured to continuously track the location of the vehicle until the call is ended to provide the driver the latest vehicle location and necessary route guidance.

Figure 4C:
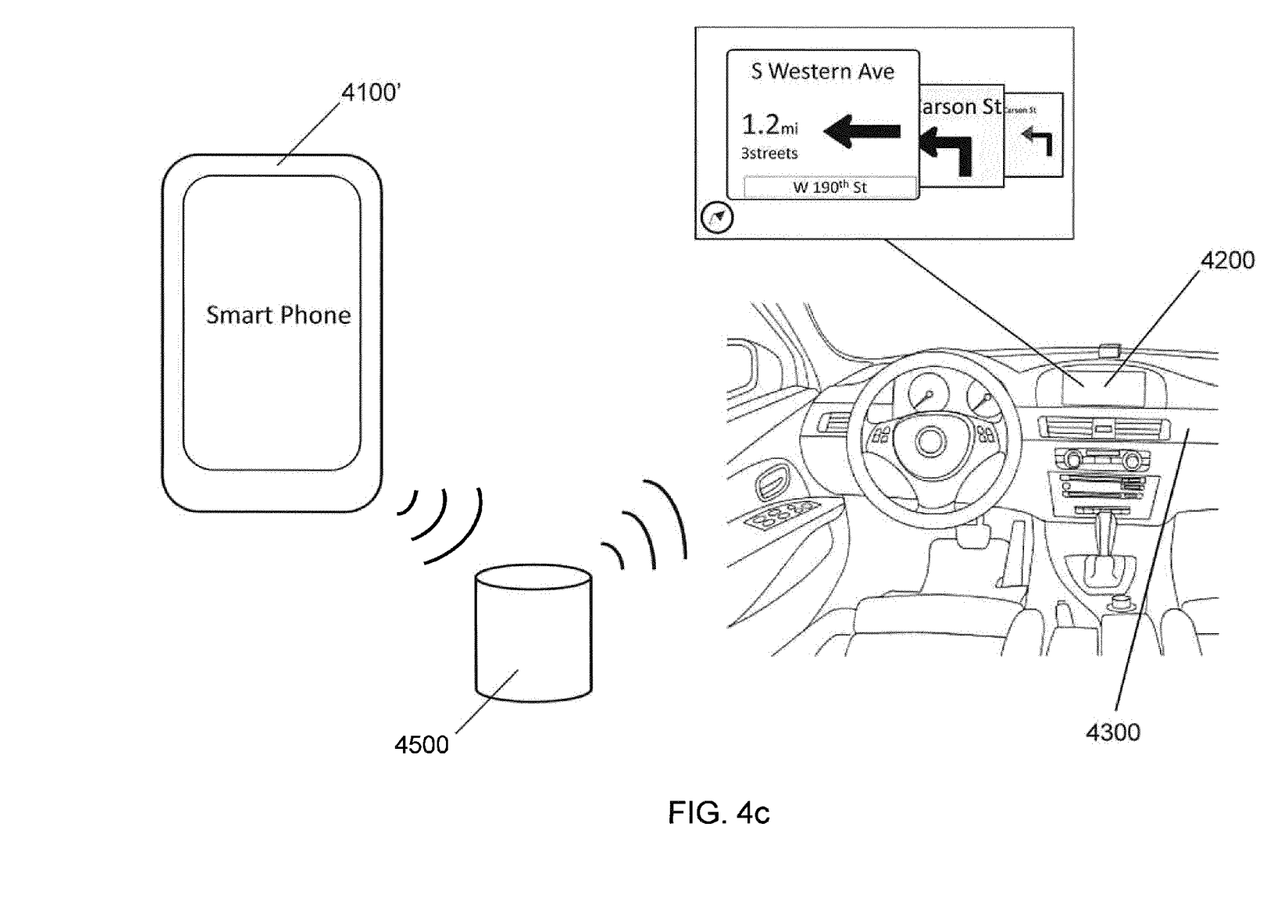
FIG. 4c illustrates a further embodiment in the present invention, wherein the communication system shown in FIG. 4 is integrated with a haptic commander.

In a further embodiment, the communication system 400 may be integrated into a haptic commander as shown in FIG. 4c. Likewise, when the incoming call occurs, the communication system 400 in the haptic commander 4500 is triggered to divert the route guidance information from the smart phone 4100' to the vehicle audio system 4300 or the display screen 4200. Also, the vehicle location detecting unit 450 may also included in the haptic commander 4500 to continuously track the location of the vehicle until the call is ended. Furthermore, the haptic commander may be wirelessly communicated with the smart phone 4100' and the vehicle audio system 4300 or display 4200 to provide the user uninterrupted route guidance.

Figure 4D:
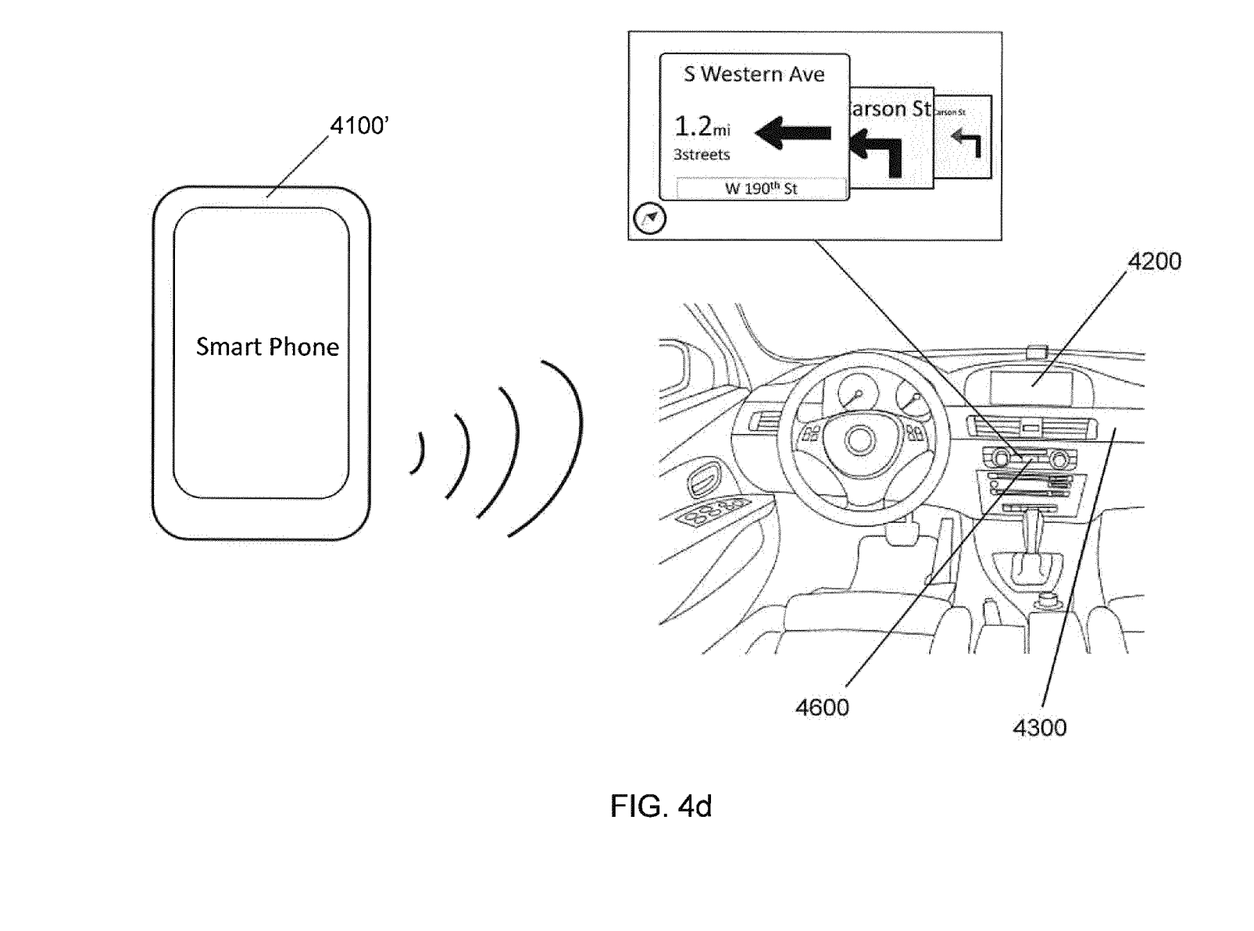
FIG. 4d illustrates an exemplary embodiment in the present invention, wherein the communication system shown in FIG. 4 is integrated with a radio head unit.

In still a further embodiment, the communication system 400 may be integrated with a radio head unit 4600, as depicted in FIG. 4d. Like previous embodiments, when the incoming call occurs, the communication system 400 in the head unit 4600 is triggered to divert the route guidance information from the smart phone 4100' to the vehicle audio system 4300 or the display screen 4200. The head unit 4600 can communicate with the smart phone 4100 either wirelessly or with wire.

Figure 5:
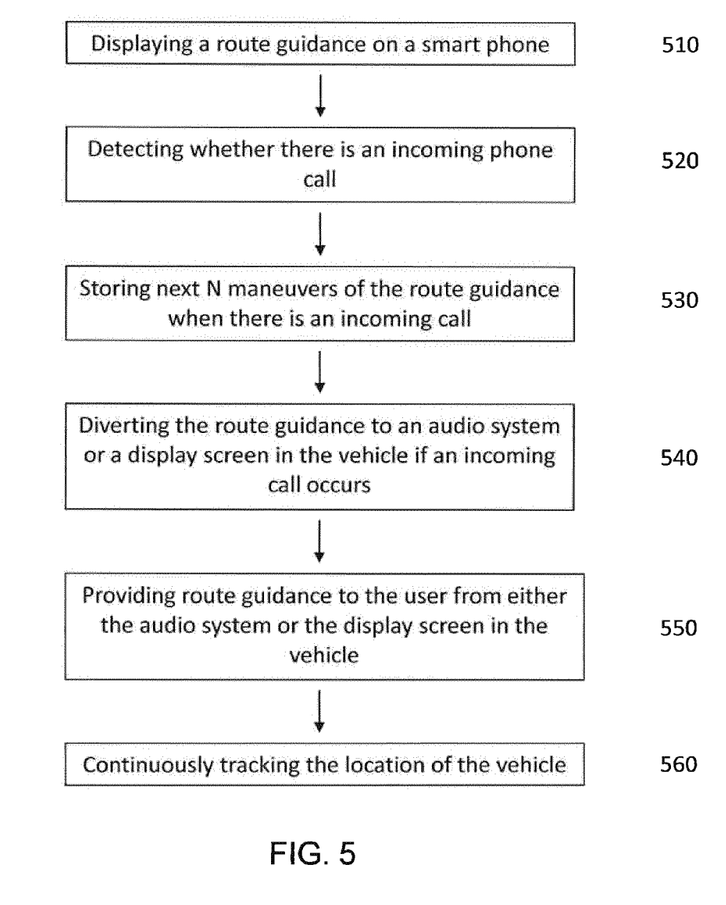
FIG. 5 illustrates another aspect of the present invention, depicting a method for providing uninterrupted route guidance to a smart phone user in a vehicle.

According to another aspect illustrated in FIG. 5, a method for providing an uninterrupted route guidance to a smart phone user in a vehicle includes the steps of displaying a route guidance operation on a smart phone 510; detecting whether there is an incoming phone call 520; storing information on the next N maneuvers of the route guidance when there is an incoming call 530; diverting the route guidance information to an audio system or a display screen in the vehicle if an incoming call occurs 540; providing route guidance to the user from either the audio system or the display screen in the vehicle 550; and continuously tracking the location of the vehicle 560.

Figure 5A:
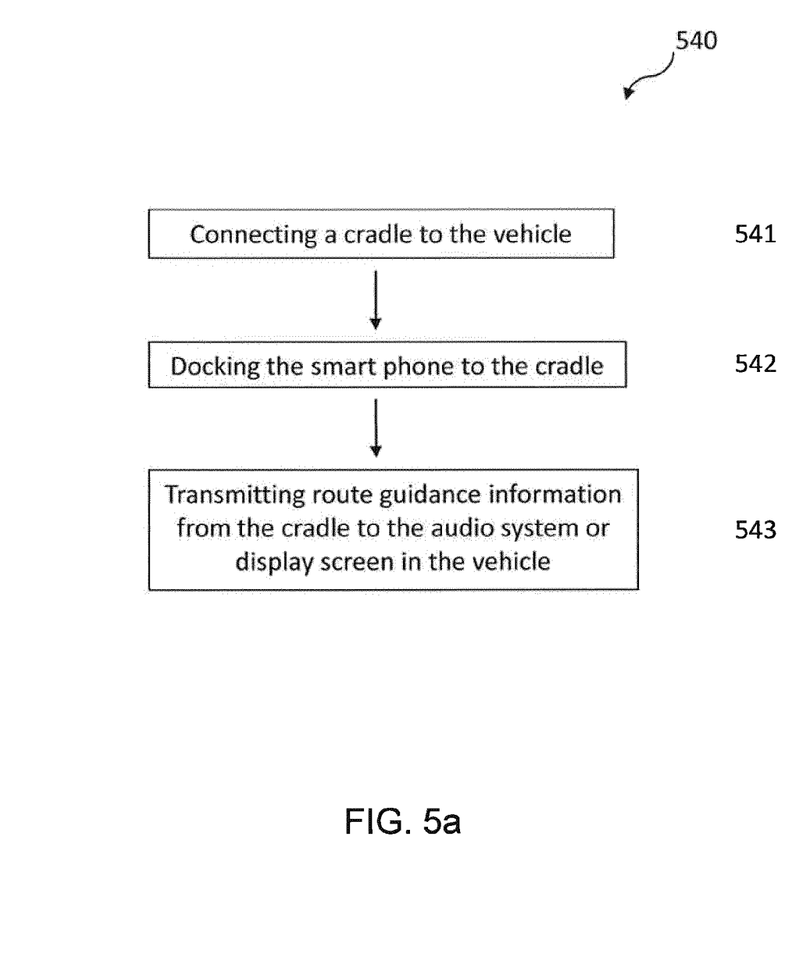
FIG. 5a illustrates one embodiment of the method shown in FIG. 5, for providing uninterrupted route guidance to a smart phone user in a vehicle.

In one embodiment shown in FIG. 5a, the step of diverting the route guidance information to an audio system or a display screen in the vehicle 540 may further include the steps of connecting a cradle to the vehicle 541; docking the smart phone to the cradle 542; and transmitting the route guidance information from the cradle to the audio system or display screen in the vehicle 543. As can be seen in FIG. 4b, the cradle 4400 is wirelessly connected to the vehicle. In another embodiment, the cradle 4400 can be connected to the vehicle with a wire.

Figure 5B:
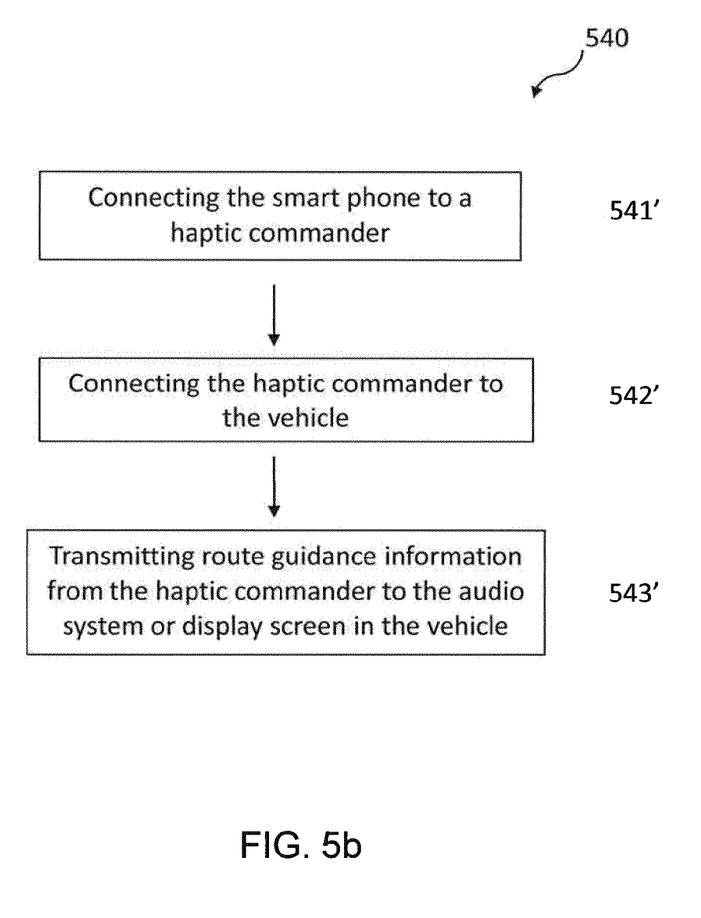
FIG. 5b illustrates another embodiment of the method shown in FIG. 5, for providing uninterrupted route guidance to a smart phone user in a vehicle.
Figure 5C:
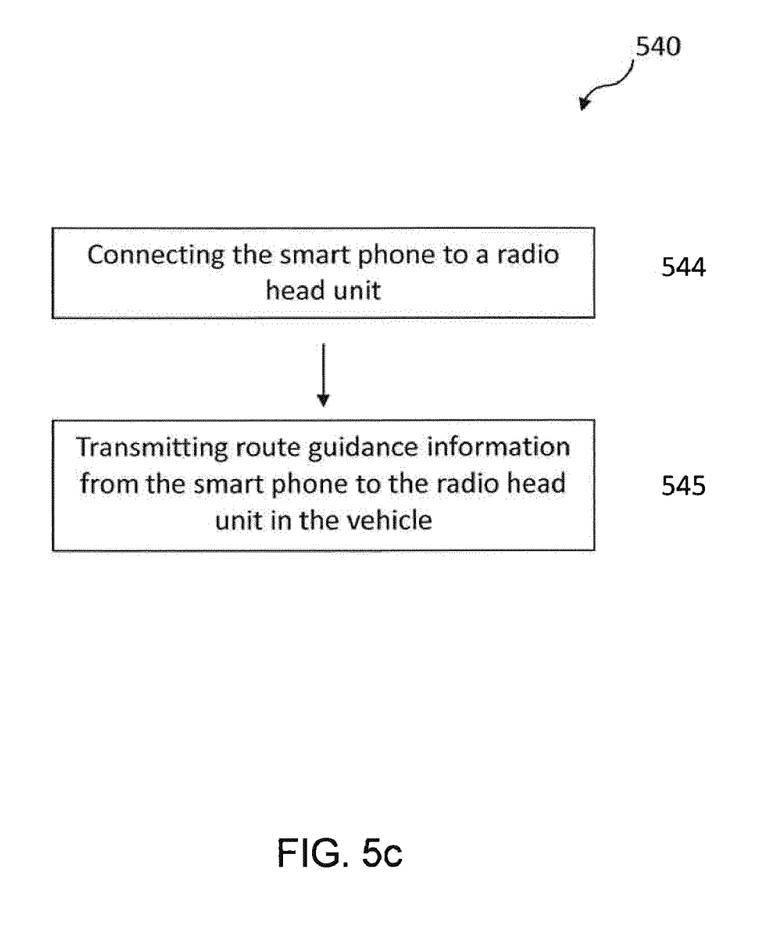
FIG. 5c illustrates a further embodiment of the method shown in FIG. 5, for providing uninterrupted route guidance to a smart phone user in a vehicle.

In some embodiments as depicted in FIG. 5b, the step of diverting the route guidance information to an audio system or a display screen in the vehicle 540 may further include the step of connecting the smart phone to a haptic commander 541'; connecting the haptic commander to the vehicle 542'; and transmitting the route guidance information from the haptic commander to the audio system or display screen in the vehicle 543'. As can be seen in FIG. 4c, the connection between either the smart phone 4100' and the haptic commander 4500, or between the haptic commander 4500 and the vehicle, can be wired or wireless. Similarly, as illustrated in FIG. 5c, step 540 may further include the step of connecting the smart phone to a radio head unit 544 and transmitting the route guidance information from the smart phone to the head unit in the vehicle 545, which is also described in FIG. 4d.

In a further embodiment, the method for providing uninterrupted route guidance to a smart phone user in a vehicle may further include a step of continuously tracking the location of the vehicle 560. As stated above, when the call is ended, the navigation application can be restarted to provide the driver the latest vehicle location and necessary route guidance. Also, if the conversation over the smart phone takes longer than the time to make the next N maneuvers, the vehicle location detecting unit 450 may still track the vehicle's current position until the navigation application is resumed. As stated above, in some smart phones, the navigation application may still be running in the background, but no voice or visual guidance is given when the user is talking.

Figure 6:
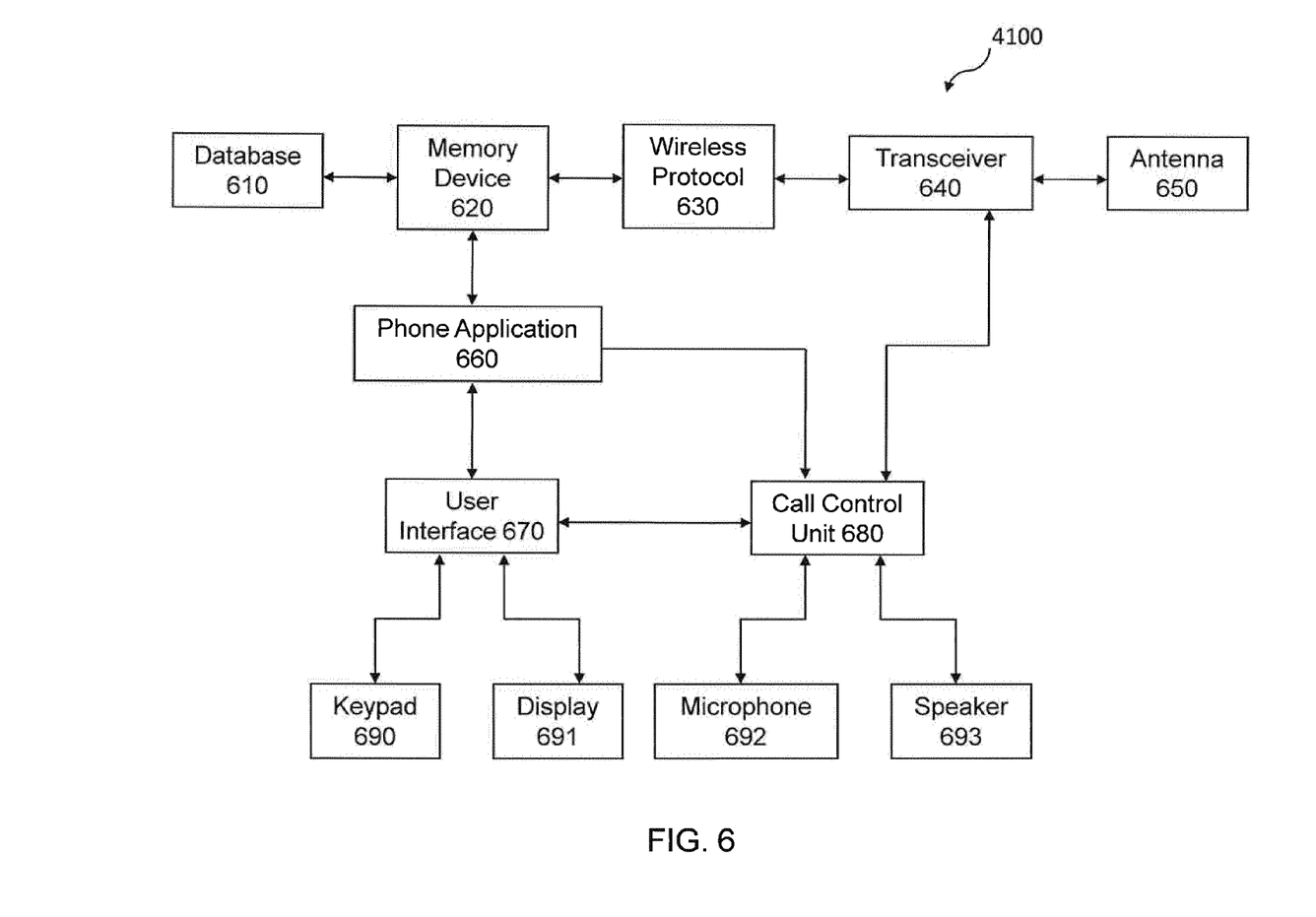
FIG. 6 illustrates a functional block diagram showing an example of structure of a smart phone implementing the method and apparatus to provide uninterrupted route guidance to a smart phone user in a vehicle.

Referring to FIG. 6, the smart phone device 4100 may include a database 610, a memory device 620, a wireless protocol 630, a transceiver 640, an antenna 650, and a plurality of phone applications 660 including a navigation application. To enable the user to place and receive phone calls in a conventional manner, the smart phone 4100 may also include a user interface 670, a call control unit 680, a keypad 690, a display 691, a microphone 692 and a speaker 693. For example, the user may place a call by entering a phone number using the keypad 690. The user interface 670 is adapted to communicate the user's action to the call control unit 680, along with displaying information to the user via the display 691. The call control unit 680 is configured to place the call using the transceiver 640 and the antenna 650. Further, the call control unit 680 is configured to provide a waiting notice to a caller of the smart phone device 4100 until a route guidance prompt is complete. The user may engage in the phone conversation in a conventional way using the microphone 692 and the speaker 693. The wireless protocol 630 conforms to the wireless communication standard and provides the smart phone 4100 data communication capabilities.

As shown in FIG. 4a, the smart phone 4100 may include the communication system 400 to provide the user uninterrupted route guidance when an incoming call occurs. More specifically, when the incoming call occurs, the call control unit 680 is configured to send a command to trigger the communication system 400, in which the memory device 410 (or a memory device in the smart phone 4100) is adapted to store information on the next N maneuvers at the time, and the communication unit 430 receives instructions from the smart phone 4100 to store the next N maneuvers information in the memory device 410, and further transmit the maneuvers information to either the vehicle audio system 4300 or display screen 4200, so that the route guidance for the driver is not interrupted by the phone call.

In one embodiment, the communication system 400 may be communicatively connected with a navigation application in the phone application 660 to continuously track the location of the vehicle, such that when the call is ended, the navigation system can be resumed to provide the driver the latest vehicle location and necessary route guidance even if the conversation over the smart phone takes longer than the time to make the next N maneuvers stored in the memory device 410. In another embodiment, as illustrated above, the communication system 400 includes the vehicle location detecting unit 450 to continuously track the location of the vehicle.

Referring to FIGS. 4b and 4c, when the communication system 400 is not integrated with the smart phone 4100, the call control unit 680 may be communicatively connected with either the cradle 4400 or the haptic commander 4500, to trigger the communication system 400 therein if there is an incoming phone call. As illustrated above, the information on the next N maneuvers (at the time of the phone call) will be transmitted to either the vehicle audio system 4300 or display screen 4200, so that the route guidance for the driver is not interrupted by the phone call. Also, the memory device 620 is updated after each maneuver is completed in the route guidance.

Having described the invention by the description and illustrations above, it should be understood that these are exemplary of the invention and are not to be considered as limiting. Accordingly, the invention is not to be considered as limited by the foregoing description, but includes any equivalents.

The invention claimed is:

1. A communication system for providing uninterrupted route guidance to a phone user in a vehicle comprising:
    a phone having a navigation system
    a memory device for storing at least a portion of route guidance information provided by the navigation system of the phone;
    a communication unit communicatively coupled to the memory device;
    wherein when an incoming call occurs, the communication unit receives instructions from the phone to transmit the route guidance information stored in the memory device to a vehicle audio system or display screen.

2. The communication system of claim 1, further comprising a vehicle location detecting unit that continuously tracks the vehicle position after the incoming call occurs, such that when the call is ended, the navigation system is resumed to provide the user a latest vehicle location and necessary route guidance.

3. The communication system of claim 1, wherein the communication system is integrated in the phone.

4. The communication system of claim 1, further comprising a cradle for mounting the phone thereon, and wherein the communication system is integrated in a the cradle, and when the incoming call occurs, the communication system in said cradle is triggered to divert the route guidance information from the phone to the vehicle audio system or the display screen.

5. The communication system of claim 1, further comprising a haptic commander, and wherein the communication system is integrated in the haptic commander which is communicatively connected with the phone, and when the incoming call occurs, the communication system in said haptic commander is triggered to divert the route guidance information from the phone to the vehicle audio system or the display screen.

6. The communication system of claim 1, further comprising a radio head unit, and wherein the communication system is integrated in the radio head unit which is communicatively connected with the phone, and when the incoming call occurs, the communication system in said radio head unit is triggered to display the route guidance information thereon, or divert the route guidance information to the vehicle audio system.

7. The communication system of claim 1, wherein the communication system is connected directly or wirelessly to the vehicle audio system or display screen.

8. A method for providing uninterrupted route guidance to a phone user in a vehicle comprising the steps of:
- conducting a route guidance operation on the phone;
- detecting whether there is an incoming phone call;
- storing at least a portion of route guidance information in a memory device;
- diverting the stored route guidance information to an audio system or a display screen in the vehicle when an incoming call occurs; and
- providing the route guidance information to the user from either the audio system or the display screen in the vehicle until the call ends.

9. The method of claim 8, wherein the step of diverting the stored route guidance to an audio system or a display screen in the vehicle further comprising the steps of:
- connecting a cradle to the vehicle;
- docking the phone to the cradle; and
- transmitting the portion of the route guidance information from the cradle to the audio system or display screen in the vehicle,
- wherein the route guidance information is either wirelessly transmitted from the cradle, or the cradle is directly connected to the audio system or display screen in the vehicle.

10. The method of claim 8, wherein the step of diverting the stored route guidance to an audio system or a display screen in the vehicle further comprising the steps of:
- connecting the phone to a haptic commander;
- connecting the haptic commander to the vehicle; and
- transmitting the portion of the route guidance information from the haptic commander to the audio system or display screen in the vehicle,
- wherein the route guidance information is either wirelessly transmitted from the haptic commander, or the haptic commander is directly connected to the audio system or display screen in the vehicle.

11. The method of claim 8, further comprising a step of continuously tracking the location of the vehicle and resuming the route guidance operation to provide a latest vehicle location when the call is ended.

12. The method of claim 11, wherein the step of continuously tracking the location of the vehicle further comprising a step of refreshing the route guidance operation according to the vehicle's current position.

13. The method of claim 8, wherein the step of storing the portion of the route guidance information when there is an incoming call comprising a step of updating the portion of the route guidance information in the memory device after completing each maneuver in the route guidance.

14. The method of claim 8, wherein the step of diverting the stored route guidance information to an audio system or a display screen in the vehicle further comprising the steps of:
- connecting the phone to a radio head unit; and
- transmitting the route guidance information from the phone to the radio head unit in the vehicle,
- wherein the route guidance information is either wirelessly transmitted from the phone, or the phone is directly connected to the audio system or display screen in the vehicle.

15. A phone device for providing uninterrupted route guidance to a user in a vehicle comprising:
- a memory device;
- a transceiver including an antenna;
- a call control unit; and
- a navigation system for conducting a route guidance operation,
- wherein the memory device stores at least a portion of route guidance information provided by the navigation system, and when the transceiver receives an incoming phone call, the call control unit diverts the route guidance information stored in the memory device to a vehicle audio system or display screen.

16. The phone device of claim 15, wherein the navigation system continuously tracks the vehicle position after the incoming call occurs and resumes the route guidance operation to provide a latest vehicle location when the call is ended.

17. The phone device of claim 15, wherein the call control unit further comprising a wireless communication unit to wirelessly transmit the route guidance information to the vehicle audio system or display screen.

18. The phone device of claim 15, wherein the call control unit is configured to provide a waiting notice to a caller of the phone device until a route guidance prompt is complete.

19. The phone device of claim 17, wherein the call control unit wirelessly transmits the route guidance information stored in the memory device to either a cradle or a haptic commander via the wireless communication unit, then to the vehicle audio system or display screen.

20. The phone device of claim 17, wherein the call control unit wirelessly transmits the route guidance information stored in the memory device to a radio head unit via the wireless communication unit to display said route guidance.

* * * * *